(12) United States Patent
Güttinger et al.

(10) Patent No.: US 12,123,529 B2
(45) Date of Patent: Oct. 22, 2024

(54) COUPLING SYSTEM

(71) Applicant: ILLINOIS TOOL WORKS INC., Glenview, IL (US)

(72) Inventors: Kai Güttinger, Darmstadt (DE); Christian Kudlek, Mannheim (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 135 days.

(21) Appl. No.: 17/608,876

(22) PCT Filed: Apr. 28, 2020

(86) PCT No.: PCT/US2020/030173
§ 371 (c)(1),
(2) Date: Nov. 4, 2021

(87) PCT Pub. No.: WO2020/226935
PCT Pub. Date: Nov. 12, 2020

(65) Prior Publication Data
US 2022/0282817 A1 Sep. 8, 2022

(30) Foreign Application Priority Data
May 7, 2019 (DE) .................... 10 2019 111 865.4

(51) Int. Cl.
*F16L 37/098* (2006.01)
*F16L 23/16* (2006.01)
*F16L 37/14* (2006.01)

(52) U.S. Cl.
CPC ........... *F16L 37/0987* (2013.01); *F16L 23/16* (2013.01); *F16L 37/144* (2013.01); *F16L 2201/10* (2013.01)

(58) Field of Classification Search
CPC ..... F16L 37/0987; F16L 23/16; F16L 37/144; F16L 37/0985; F16L 37/091; F16L 37/098
See application file for complete search history.

(56) References Cited

U.S. PATENT DOCUMENTS 4,915,421 A   4/1990 Dennany, Jr.
5,193,857 A   3/1993 Kitamura
(Continued)

FOREIGN PATENT DOCUMENTS

CN   103807542 A   5/2014
CN   103906962 A   7/2014
(Continued)

OTHER PUBLICATIONS

PCT, International Search Report and Written Opinion, International Application No. PCT/US2020/030173; date of mailing Aug. 11, 2020, 13 pages.

*Primary Examiner* — David Bochna
(74) *Attorney, Agent, or Firm* — THOMPSON HINE LLP

(57) ABSTRACT

A coupling system, in particular for tubular elements, with a socket element and a plug-in element, wherein a locking element is also provided, wherein the socket element has a tube-like receiving region for receiving the plug-in element, wherein the locking element has a securing element which is supported in the plugging-in direction against a securing mating element of the plug-in element and the locking element is supported with a locking device against a locking mating device on the socket element, and therefore the socket element and the plug-in element are secured axially indirectly via the locking element and thus via the securing element, the securing mating element and the locking device and the locking mating device.

15 Claims, 8 Drawing Sheets

(56) References Cited

U.S. PATENT DOCUMENTS

| | | | |
|---|---|---|---|
| 5,297,818 A | 3/1994 | Klinger | |
| 5,499,848 A | 3/1996 | Kujawski | |
| 5,542,712 A * | 8/1996 | Klinger | F16L 37/0987 285/259 |
| 5,893,590 A * | 4/1999 | Klinger | F16L 37/0987 285/914 |
| 2004/0066034 A1 | 4/2004 | Takayanagi | |
| 2005/0206161 A1* | 9/2005 | Ogiso | F16L 37/0987 285/319 |
| 2006/0022461 A1* | 2/2006 | Hull | F16L 37/0987 285/319 |
| 2007/0001453 A1* | 1/2007 | Miyajima | F16L 37/0987 285/319 |
| 2010/0213702 A1* | 8/2010 | Ishii | F16L 37/0987 285/33 |
| 2013/0221665 A1 | 8/2013 | Okazaki | |
| 2015/0145243 A1* | 5/2015 | Dude | F16L 37/0982 285/308 |
| 2018/0347739 A1 | 12/2018 | Chatelain | |

FOREIGN PATENT DOCUMENTS

| | | |
|---|---|---|
| CN | 109477604 A | 3/2019 |
| DE | 3710853 A1 | 10/1988 |
| DE | 102015201367 A1 | 8/2015 |
| EP | 1682810 B1 | 7/2006 |
| EP | 1929192 B1 | 2/2011 |
| EP | 3467367 A1 | 4/2019 |
| FR | 3044382 A1 | 6/2017 |
| GB | 2398612 A | 8/2004 |
| WO | WO 0014445 A1 | 3/2000 |

* cited by examiner

COUPLING SYSTEM

TECHNICAL FIELD

The invention relates to a coupling system for tubular elements.

BACKGROUND

A multiplicity of connection solutions are known for connecting tubular elements. Tubular elements are connected to one another in order, for example, to create a continuous line for liquids or in order to create a continuous covering for electric lines or data lines, for example.

For this purpose, it is important to connect the tubular lines to one another in such a manner that a reliable, permanent connection is ensured which optimally can also be released again.

Pipelines of this type are conventionally formed from plastics, wherein, in many cases, a plug-in latching connection is provided, in which latching elements grip behind corresponding mating latching elements. A frequent demand in this connection of at least one of the latching elements is for the latter to be mounted resiliently in order to be able to snap behind the mating element if an engagement of sufficient depth has been brought about.

A fundamental disadvantage of plastics is that spring forces of this type cannot be maintained over the long term since plastics have a tendency to creep or to change shape, in particular under the effect of temperature.

In addition, plastics age and change their properties in accordance with respective known isochronous stress-strain diagrams which are conventionally provided for plastics.

EP 1 682 810 B1 discloses a device for connecting two rigid tubular objects which comprise a plug-in part and a receiving part.

The plug-in receiving part or socket part consists of a sleeve which, at one of its ends, assembles an integral part of one of the objects or is connected to said part and which, at its other end, is provided with at least one recess, wherein the plug-in part consists of a tube section which, at one of its ends, assembles an integral part of the other of the objects or is connected to said part and, at its other end, the outer wall of said tube section is formed with a transversely running edge formed by a notch. The transversely running edge is arranged in the outer wall of the plug-in part. In addition, a sleeve-shaped element is arranged between the parts when the plug-in part is pushed into the socket part, wherein said element is provided with at least one elastic tongue having a first device for elastically engaging in the recess of the socket part when the element is pushed into the socket part, and a second device which is arranged for elastically snapping into the space behind the transversely running edge of the plug-in part when the plug-in part is pushed into the element. The elastic tongue enables the socket part and the plug-in part to be separated by the element being rotated relative to the plug-in part into a position in which the second device of the elastic tongue is placed radially outside the transversely running edge of the plug-in part, wherein, during the rotation, for separating purposes, the elastic tongue is raised radially outside the transversely running edge of the plug-in part by a section in the recess of the socket part. A disadvantage of this device is that a pulling movement and a rotational movement are necessary for the release.

A further disadvantage is that use is made of resilient latching elements, the spring force of which may slacken over the long term.

U.S. Pat. No. 5,499,848 discloses a further plug-in connection for a pipe system.

This plug-in connection is intended to bring about a liquid-tight connection, wherein the intention is to overcome the disadvantage in the prior art that an incomplete and non-tight connection cannot be identified in good time. It is explained that the prior art contains an option for checking the connection by pulling on the plug-in element. In addition, it would be possible to provide a connection where clear latching into place is audible. In addition, visual identifications are also known in the prior art, but they, like the previously mentioned measures, would provide lots of possibilities for erroneous operation. It is an object to provide a visual indicator for a correct connection that uses separate movements or forces in order to move the plug-in element into a correctly locked position and in order to activate the connection verification mechanism.

According to this publication, verification of a correct connection for a rapid-action coupling is intended to be able to be activated only when the correct connection has been produced and exclusively by applying a pulling-out force to the plug-in element.

For this purpose, U.S. Pat. No. 5,499,848 proposes providing a rapid-action connector coupling, with a hollow socket body and a plug-in body, which can be accommodated in said socket body and which has a radially enlarged annular groove, and also a retaining device which is connected to the plug-in body and is connectable to the annular groove, in order to secure the plug-in body in the socket body, and an indicator which is connected to the socket body and is selectively movable in order to indicate whether the plug-in body is retained in the socket body, wherein the plug-in body is movable in a first direction relative to the socket into a locked position, wherein the contact between the retaining device and the annular groove keeps the plug-in body in the socket body, wherein the indicator is secured relative to the socket body during the movement into the locked position, and remains secured in the locked position until the latter is taken up, and wherein the plug-in body is movable from the locked position in a second direction into a verification position, wherein contact remains between the annular groove and the retaining device in order to hold the plug-in body in the socket body, and wherein the indicator is moved relative to the socket body during the displacement out of the locked position into the verification position, in order to indicate a correct coupling.

A general disadvantage in the prior art is that high forces act on the connecting elements and, in addition, there are poor ergonomics with the assembly and the separating.

Furthermore, there are solutions in the prior art, in which locking takes place by means of rotation, wherein it is disadvantageous that two different movements are involved.

SUMMARY

It is the object of the invention to provide a rapid-action coupling system for pipelines, which permits simplified installation, i.e. simple coupling, wherein the reaching of the coupling state securely can be seen and felt and also the coupling is stable over the long term and with respect to fatigue.

The object is achieved with a coupling system having the features of claim 1.

Advantageous developments are characterized in subclaims which are dependent thereon.

The design according to the invention permits a simplified coupling, but also a simplified release of the coupling. The coupling design here is secure over the long term and is not susceptible to fatigue. The forces to be applied are lower because of the ergonomic configuration.

In order to bring about the coupling, a socket element and a plug-in element of two pipelines to be connected interact. In order to couple the two pipelines to each other and to lock same on each other, there is a locking element which firstly interacts in a locking manner with the socket element of the one pipeline section, by gripping behind the socket element, and which also has securing elements which are brought via at least one control surface in each case into engagement behind a securing element of the plug-in element of the other pipeline part such that, in the locked state, the locking element is locked axially on the socket element and the plug-in element is secured by the locking element, and therefore the socket element and the plug-in element are secured indirectly via the locking element so as to be releasable in relation to each other.

In the locked state, rather than spring forces being in action, the securing elements which hold the plug-in element in the locking element, are secured by a form fit and force fit in engagement behind the plug-in element while the means which are supported against the socket part are free of forces in the supporting state.

It is of advantage in the invention that only one additional component is necessary in addition to the pipeline elements for the coupling, wherein the just one additional component can be preassembled on the socket element.

BRIEF DESCRIPTION OF THE DRAWINGS

The invention will be explained by way of example with reference to a drawing of a possible embodiment, in which.

DETAILED DESCRIPTION

Figure 1:
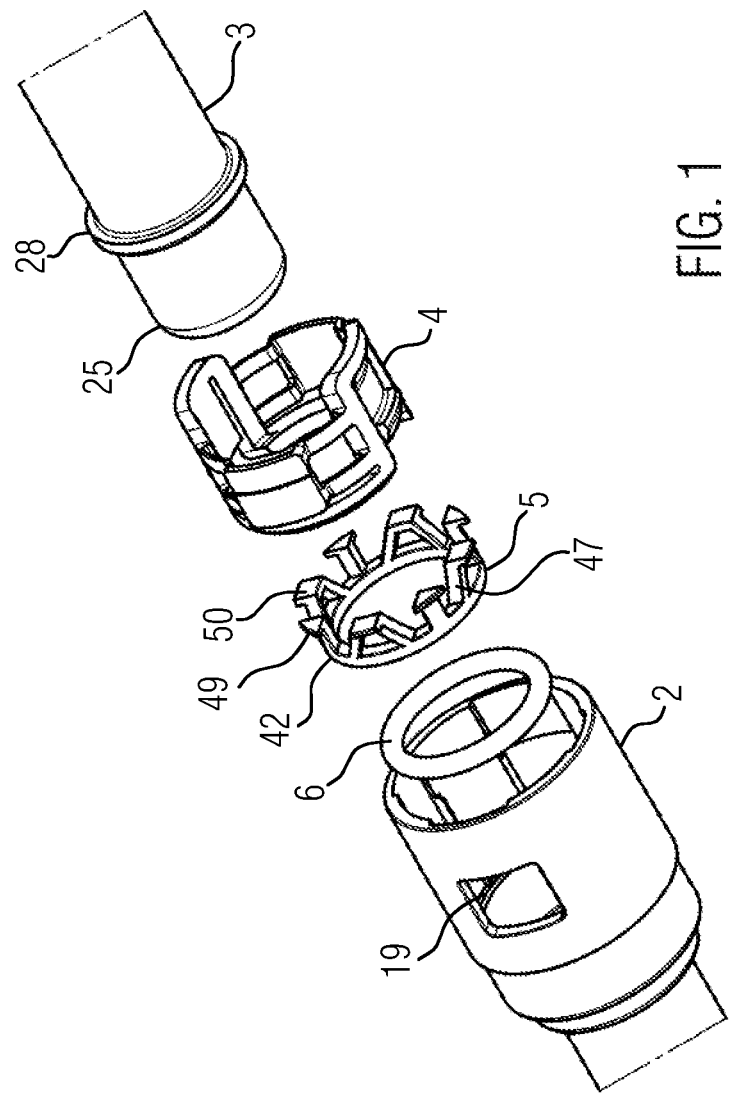
FIG. 1 shows the coupling system according to the invention in an exploded view.
Figure 2:
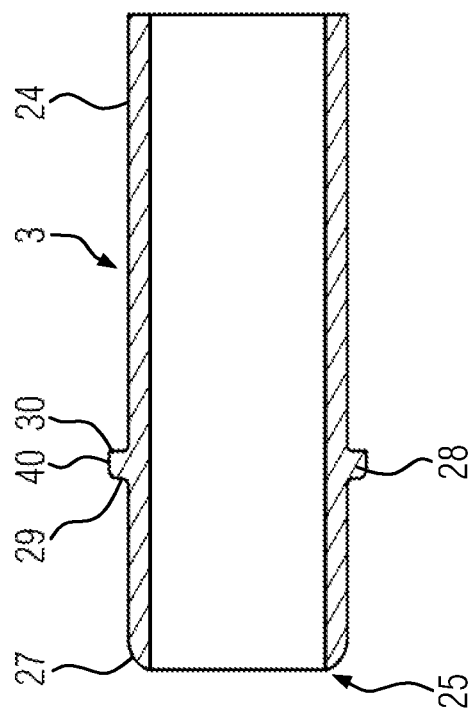
FIG. 2 shows the coupling system according to FIG. 1 in a longitudinally sectioned, non-coupled position.
Figure 2:
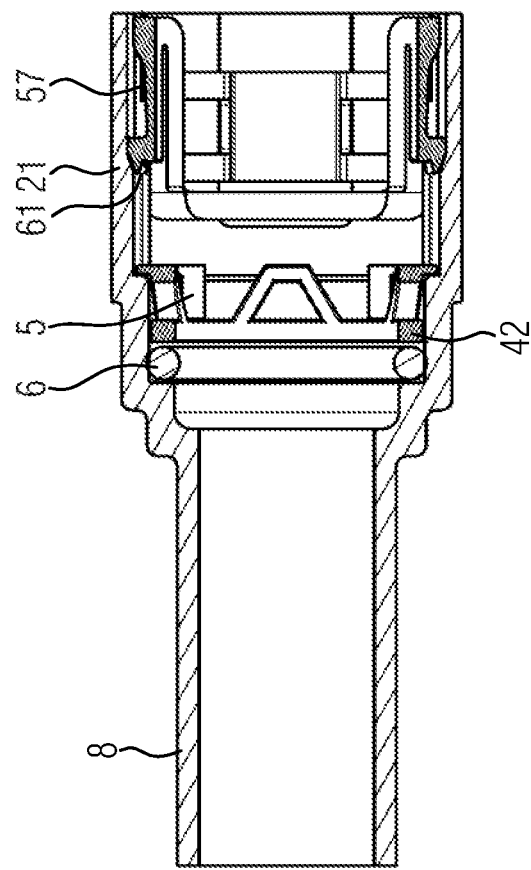

The coupling system 1 according to the invention consists of a socket element 2, a plug-in element 3, a locking element 4, a securing element 5 and a seal 6 (FIG. 1).

Figure 3:
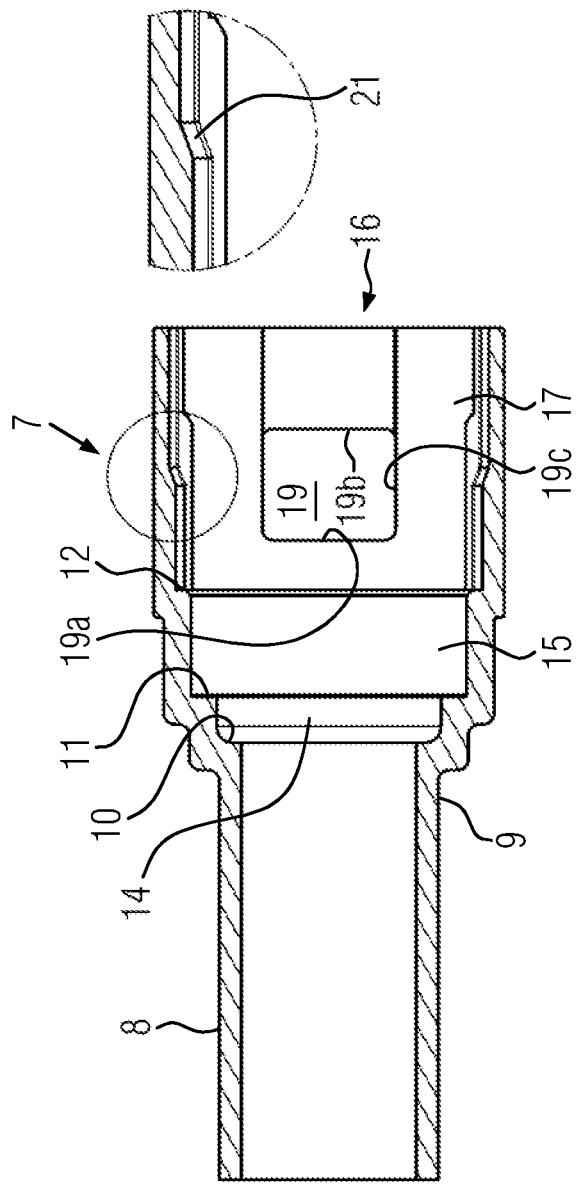
FIG. 3 shows the socket element of the coupling system in a longitudinal section.

The socket element 2 (FIG. 3) is formed at one end 7 of a pipeline section 8 to be connected. The socket element 2 is formed in a hollow cylindrical manner with a cylinder lateral wall 9.

From an inside diameter of the pipeline section 8, the cylinder lateral wall 9 of the socket element 2 extends with a first step 10 to form a first diameter of the socket element 2 and from there with a second step 11 to form a second diameter and in turn from there with a third step 12 to form a third further diameter of the socket element 2.

In axial extent, a first receiving space 14 is formed between the step 10 and the step 11 and a second receiving space 15 is formed axially between the step 11 and the step 12. A third receiving space 17 is formed between the step 12 and a mouth 16 of the socket element 2. The third receiving space 17 is therefore wider than the second receiving space 15, and the second receiving space 15 is wider than the first receiving space 14.

From the mouth 16, two diametrically opposite grooves 18, 20 are introduced on the inside in the cylinder lateral wall 9, wherein each pair of grooves is therefore offset by 180 degrees with respect to each other and the groove pairs 18, 18 are offset by 90° with respect to the other groove pair 20, 20' in each case. A first pair of grooves 18 extends from the mouth axially approximately over ¾ of the axial extent of the receiving space 17 and has a groove width which is approximately ⅛ of the inner circumference of the cylinder wall 9. The groove 18 opens outward with an opening 19 through the cylinder lateral wall 9, wherein the opening 19 axially is approximately the length of half of the length of the groove 18. The opening 19 is of approximately rectangular or square design here with rounded corners.

Grooves 20 which extend from the mouth 16 as far as the step 12 are arranged offset by 90° with respect to the groove 18 or with respect to the grooves 18, wherein the grooves, however, taper with a ramp 21 to level with approximately the axial half of the extent of the receiving space 17.

The opening 19 has a front radial edge 19*a* which is oriented toward the pipeline section, a rear edge 19*b* which is arranged toward the mouth and two axial edges 19C which are formed in an extension of the edge radially bounding the groove 18.

The plug-in element 3 is designed as a socket piece of a pipeline section 24 to be connected to the pipeline section 8. The inside diameter of the pipeline section 24 here is preferably, but not necessarily, equal to the inside diameter of the pipeline section 8.

The pipeline section 24 of the plug-in element 3 has a mouth 25, wherein a pipeline wall 26 of the pipeline section 24 or of the plug-in element 3 in this region is formed with a rounded portion 27 preferably counter to the plugging-in direction.

At a distance from the mouth 25, an annular flange 28 is arranged encircling radially on the outer side and in particular is formed integrally with the pipe lateral wall 26. The annular flange 28 has a front edge 29 toward the mouth and, pointing away from the mouth 25, a rear edge 30 running in particular parallel to the front edge, and also an encircling outer edge 40.

The outside diameter of the pipe lateral wall 26 of the plug-in element 3 corresponds at maximum to the inside diameter of the socket element 2 in the region of the first receiving space 14, wherein preferably the step 10 of the socket element 2 is rounded in a manner corresponding to the rounded portion 27 of the front edge of the plug-in element 3 in the region of the mouth 25 thereof.

The seal 6 is, for example, an O-ring seal 6, wherein the O-ring seal 6 has an inside diameter which is preferably somewhat smaller than the outside diameter of the plug-in element 3, and has an outside diameter which is preferably somewhat larger than the inside diameter of the second receiving space of the socket element. When the plug-in element 3 is pushed completely into the socket element 2 and therefore the mouth 25 of the plug-in element 3 lies against the step 10 of the socket element, the seal 6 therefore surrounds the lateral wall 26 of the plug-in element 3 between the mouth and the annular flange 28 in an elastically expanded manner and is preferably arranged lying with a sealing fit against the step 11 and the cylinder lateral wall 9 in the region of the second receiving space.

In order to keep the seal 6 in its place in a defined manner and also to axially secure same in the mounted state, the securing element 5 is provided, wherein the securing element 5 has an annular element 42, wherein an outer encircling edge 43 delimits the diameter, and the outer diameter of said annular element 42 corresponds to the inside diameter of the socket element 2 in the second receiving space 15. A front edge 44 in the plugging-in direction is designed to lie against the seal 6. A plurality of elements 46 are arranged at a rear edge 45, wherein the elements 46 extend axially from the rear edge 45 counter to the plugging-in direction and radially somewhat outward.

At their ends 48, the elements 46 have flat flange sections 49 which protrude radially outward and form an annular surface 50 which is interrupted in the axial direction.

If the securing element 5 is arranged lying against the seal 6 with the front edge 44 in the second receiving space 15, the spring elements 47 are slightly bent inward corresponding to the inside diameter of the second receiving space 15 such that a frictional force is formed between the securing element 5 and the socket element 2, the frictional force keeping the securing element 5 and the seal 6 in their place. In order to axially secure the securing element 5, the flange sections 49 lie with front edges in the plugging-in direction against the step 12.

The annular element 42 of the securing element 5 has an outside diameter which preferably corresponds to the inside diameter of the socket element 2 in the region of the first receiving space 14, and therefore the annular element 42, in addition to securing the seal 6, takes on a guide function for the plug-in element 3. In interaction with the rounded portion 27 of the mouth 25 of the plug-in element 3, the element 5 can take on a guide function, wherein a type of locating funnel is formed by the rounded portion 17 and by the slightly oblique arrangement of the spring elements 47, said locating funnel permitting the plug-in element 3 to be supplied into the end position gently and in a manner free from tilting.

Figure 4:
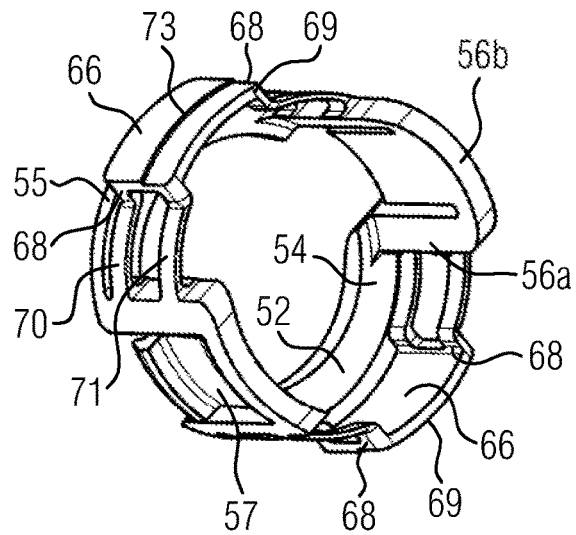
FIG. 4 shows the locking element of the coupling system in a perspective view.
Figure 5:
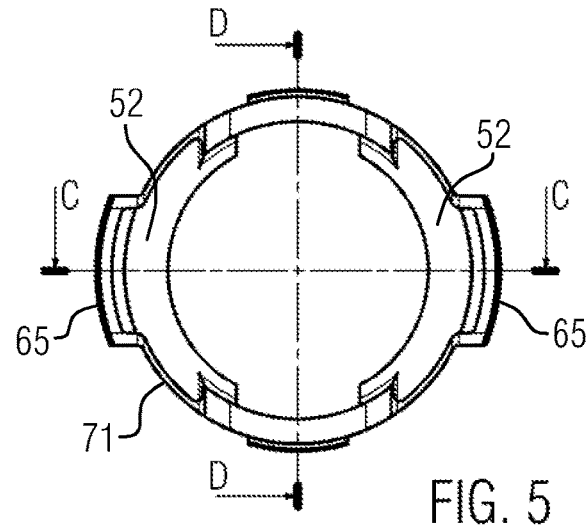
FIG. 5 shows the locking element according to FIG. 4 in a view from the plug-in side.
Figure 6:
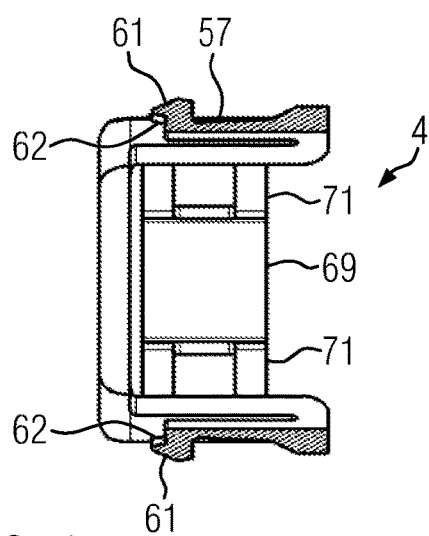
FIG. 6 shows the locking element according to FIG. 5 in a sectional view corresponding to the line D-D according to FIG. 5.
Figure 7:
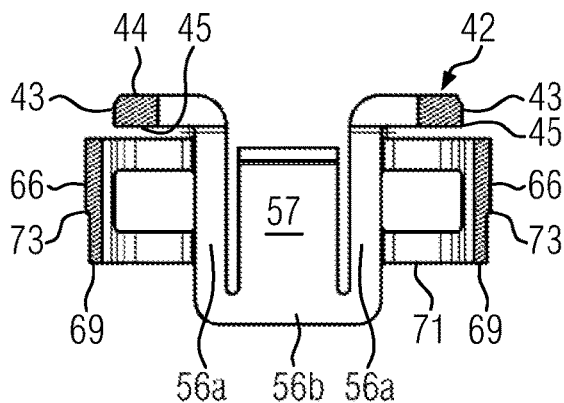
FIG. 7 shows the locking element according to FIG. 4 in a sectional view corresponding to the line C-C according to FIG. 5.
Figure 8:
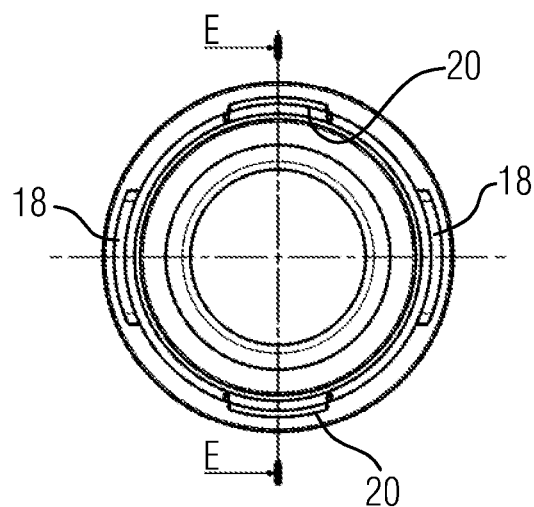
FIG. 8 shows the socket element in a view in the plugging-in direction.
Figure 9:
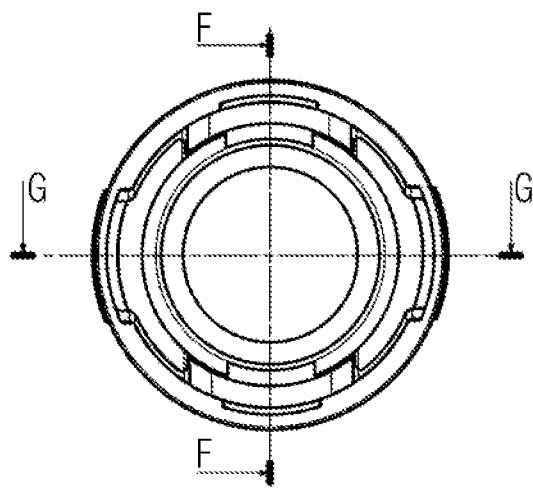
FIG. 9 shows the socket element with a locking element located therein in preassembly, in a view in the plugging-in direction.
Figure 10:
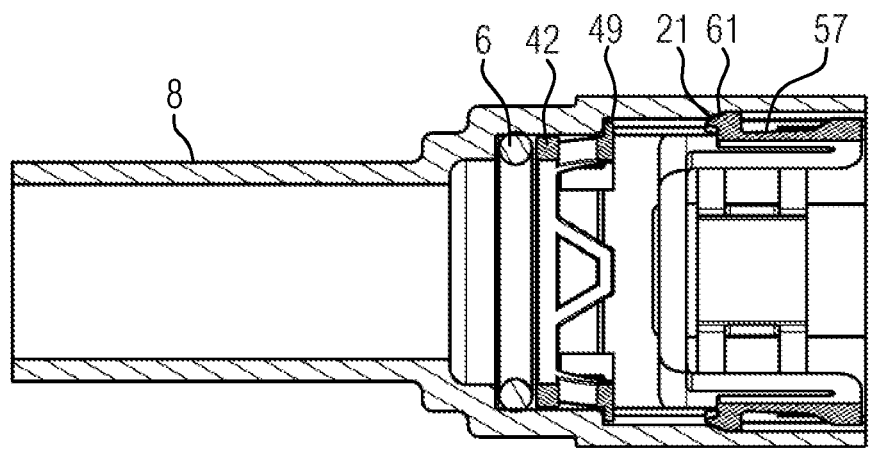
FIG. 10 shows the socket element with the locking element and further elements in a sectioned view corresponding to the line F-F according to FIG. 9.
Figure 11:
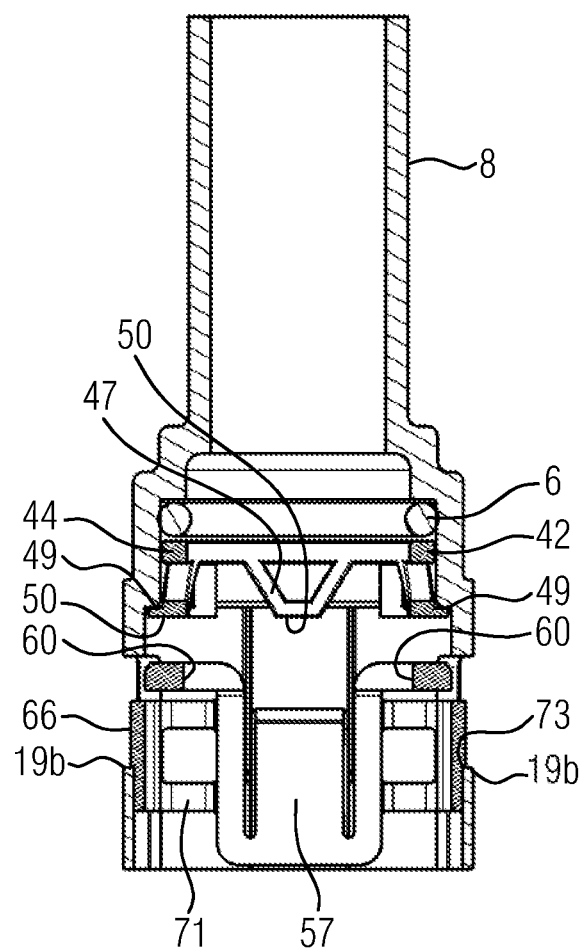
FIG. 11 shows the socket element with the locking element according to FIG. 10 in a sectional view corresponding to the line G-G according to FIG. 9.
Figure 12:
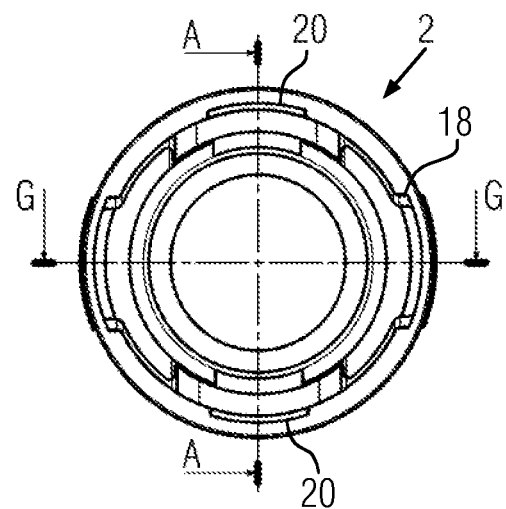
FIG. 12 shows an axial view in the plugging-in direction of the coupling system in the coupled state.
Figure 13:
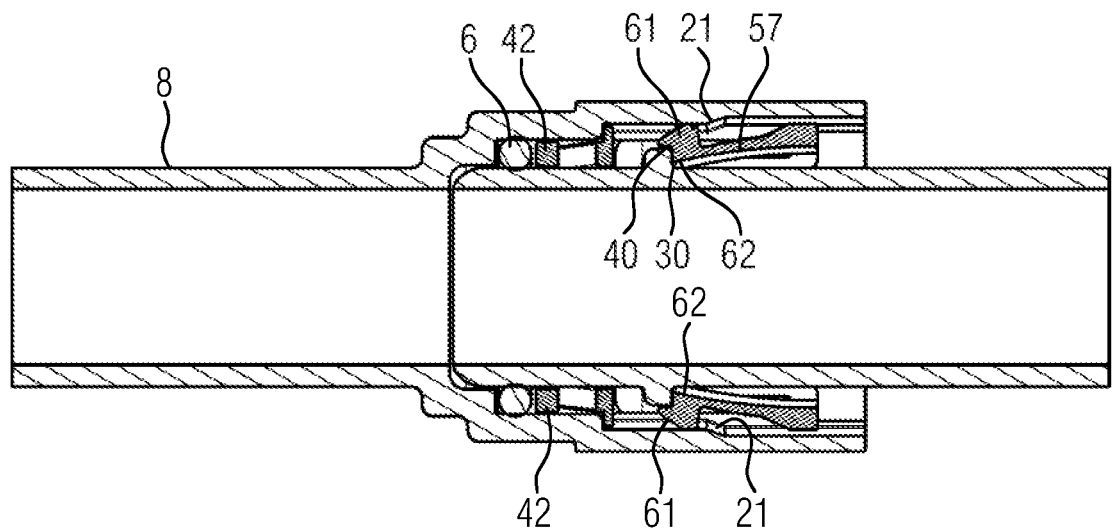
FIG. 13 shows a longitudinal section through the coupling system according to FIG. 12 corresponding to the line A-A.
Figure 14:
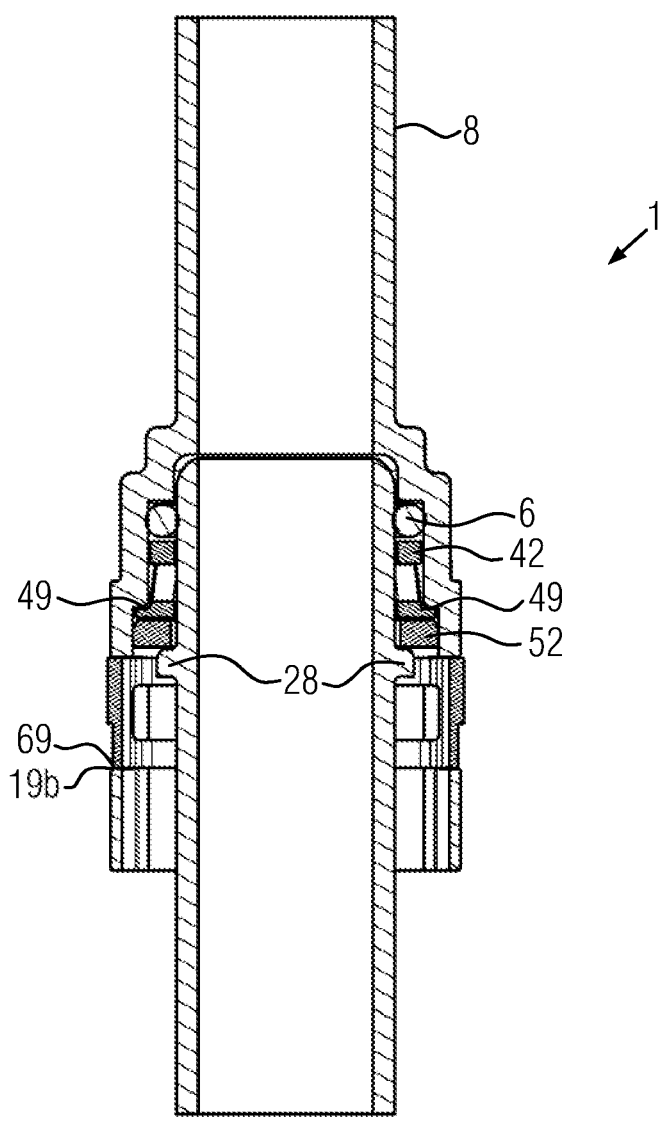
FIG. 14 shows a longitudinal section through the coupling system according to FIG. 12 in the mounted state in a sectioned view corresponding to the line H-H according to FIG. 12.

The locking element 4 (FIGS. 4-6) is an element having a substantially tubular or cylindrical basic shape.

At the front in the plugging-in direction, the locking element 4 has two radially diametrically opposite, inwardly extending annular segments 52. The annular segments have an axial front edge 53 in the plugging-in direction, a rear edge 54 and an outer edge 55.

The two annular segments 52 are each connected to each other via two elements 56 which extend axially in the mating plugging-in direction and are U-shaped in top view, wherein the U-shaped elements are formed from the end of each annular segment 52 with a first axially running arm 56*a* and a base web 56*b* connecting the arms 56*a*. The U-shaped elements 56 are also formed in a manner continuing the circle or a cylinder lateral wall in accordance with the circumference of the annular segments 52, and therefore the ring of the annular segments 52 is closed by the U-shaped elements in axial top view.

Locking tongues 57 which extend forward in the axial plugging-in direction are arranged in the region of the base webs 56*b*.

The locking tongues 57 extend axially in the plugging-in direction from the base web 56*b* and end just before the attachment of the webs 56*a* to the annular segment elements 52.

The locking tongues 57 are extended at their free ends by radially outwardly protruding flange portions, wherein the flange portions 51 have a rectilinear edge 60 at the rear axially in the plugging-in direction and there is a chamfer 61 at an axial front side of the flange portions. The chamfer 61 extends axially forward beyond the tongue in such a manner that a front edge 62 protrudes axially over the tongue 57 from the chamfer 61.

Latching elements 65 are arranged in resiliently flexible manner between the U limbs 56*a* of a circular segment, wherein the latching elements 65 in top view are of approximately rectangular or square box-like design with rounded corners and correspond in shape to the shape of the opening 19.

The box-like latching elements 65 have a box top 66, a front box wall 67, two lateral box walls 68 and a rear box wall 69. The front box wall 67 is at the front in the plugging-in direction while the rear box wall 69 is the rear wall in the plugging-in direction. The front box wall 67 and the rear box wall 69, and also the two lateral box walls 68 are formed parallel to one another and extend radially inward from the box top 66. The box top 66 here is formed in a manner curved corresponding to the basic shape of the locking element 4, the basic shape being designed overall as a tube or cylinder, i.e. corresponding to a radius.

A front spring arm 70 and a rear spring arm 71 extend to the adjacent U limb 56*a* from the lower side of the box side walls 68 in each case as an extension of the front box wall 67 and the rear box wall 69. In a manner corresponding to the curvature of the tubular or cylindrical basic shape of the locking element 4, the spring arms 70, 71 are each formed in a correspondingly curved manner, wherein the spring arms 70, 71 are arranged below the box top 66 in such a manner that the box top and the box-like latching element 65 each protrude radially beyond the remaining cylinder lateral surface.

The box top 66 of the latching elements 65 has a latching step 73 approximately in its axial longitudinal center. The box top extends with the latching step 73 radially, as seen in the plugging-in direction.

The spring arms provided support the latching elements 65 in a flexibly resilient manner against pressure radially inward in their protruding position.

The radial width of the latching elements 65 corresponds here to the radial width of the grooves 18, wherein the radial width of the locking tongues 57 corresponds to the radial width of the grooves 20.

The axial distance between the front edge 62 of the locking tongue 47 and the axially rear edge 54 of the annular segments 52 preferably corresponds to the thickness of the annular flange 28 of the plug-in element 3 between the rear edge 30 and the front edge 29.

A radially inner encircling surface or edge 60 of the circular annular segments 52 has a diameter which corresponds to the outer diameter of the plug-in element 3, while the remaining elements of the locking element 4 define a diameter between them which corresponds to, or is slightly larger than, the outer diameter of the annular flange 28 of the plug-in element 3.

In the preassembled state of the coupling system 1, the seal 6 and the securing element 5 are arranged in the socket element 2 in the manner already described. The locking element 4 rests with the locking tongues 57 in the grooves 20, wherein the oblique front edge 61 of the locking tongue 57 lies against the ramp 21. The latching elements 65 rest in the grooves 18, specifically in such a manner that the latching step 73 lies against a rear radial edge 19b of the opening 19, and therefore the radially wider region of the box top 66 is located in the opening 19 while the diameter of the narrower region of the box top 66 is still located in the groove 18. The latching step 73 and the rear radial edge 19b of the opening 19 react here as the locking element is being pulled out of the socket element 2.

In order to produce the sealing connection between the plug-in element 3 and the socket element 2, the plug-in element 3 is now pushed with its mouth 25 in front into the socket element 2.

In this case, the plug-in element 3 first of all enters with the mouth into the region between the U-shaped elements 56 and—facilitated by the rounded portion 27—then into the region between the inner edges 60 of the circular-segment-shaped elements 52, by means of which the plug-in element 3 is already guided radially.

During the further pushing in, the mouth 25 enters the region of the securing element 5 by being guided into the region of the seal 6 by the type of locating funnel extending outward in the manner of a funnel.

During the plugging-in movement, after a predetermined distance, the front edge 29 of the annular flange 28 of the plug-in element 3 lies against an axially rear surface 54 of the annular segment elements 52 of the locking element 4 and pushes the locking element 4 together with the plug-in element further into the receiving space 3.

The front edges 67 of the locking tongues 57 are located here spatially axially behind the rear edges 30 of the encircling flange 28 and, by interaction of their oblique front edges 61 together with the oblique surface or ramp 21, are bent inward in such a manner that they pass behind the rear edge 30. The front edge 29 of the annular flange 28 therefore acts via the axially rear surface 54 of the annular segment elements 52 as a driver for the locking element 4. The front edge 29 of the annular flange 28 is the driver element here and the axially rear surface 54 of the annular segment element 52 the driver mating element.

At the same time, the latching elements 65 now enter completely into the region of the recesses 19 and snap into the latter in a manner corresponding to the force of the spring arms 70, 71.

The front edges 62 of the locking tongues 57 and the axially rear edges 30 of the encircling annular flange 28 therefore act as elements securing the plug-in element 3 on the locking element 4. The front edge 62 here is the securing element while the rear edge 30 of the encircling annular flange 28 is the mating securing element.

The mouth 25 of the plug-in element 3 lies with the rounded portion 27 against the rounded step 10 of the first receiving space 14, and the plug-in element 3 is secured radially in the receiving space 14, 15 by the seal 6, the annular element 42 of the securing element 5, the inner edges 60 of the annular segments 52 and also the locking tongues 57.

The rear wall 69 of the box-like latching element 65 lies here against the rear radial edge 19b of the opening 19 and therefore supports the locking element 4 on the socket element 2 counter to the pulling-out direction, wherein the rear wall 69 of the latching element 65 forms a locking device and the rear radial edge 19b forms the corresponding mating locking device.

The plug-in element is therefore locked axially and held secured in a sealing manner in the socket element 2 by securing element and securing mating element, on the one hand, and locking device and locking mating device, on the other hand, each acting in a supporting manner on one another and therefore the plug-in element 3 being secured indirectly in the socket element 2 in a manner locked via the locking element 4.

At the same time, the annular surfaces 50 of the spring elements 47 of the securing element 5 and the front surfaces 53 of the annular segments 52 interact in a manner axially securing the seal 6.

In the mounted state, the locking element 4 is therefore located concentrically around the plug-in element 3 and therefore radially between plug-in element 3 and socket element 2 while the seal 6, the securing element 5 and the locking element 4 are in each case arranged coaxially axially consecutively about the plug-in element 3.

In order to release the connection, the locking elements are pressed radially inward, as a result of which the engagement between the edge 19b of the recess 19 and the axially rear edge 69 of the locking elements 65 is released and, upon corresponding pulling, the locking elements slide again into the groove 18. Said locking elements initially slide into the groove 18 as far as the step 73 and remain there such that the surface 61 of the locking tabs 57 passes out of the region of the ramp 21 again, and therefore said locking tabs can spring outward in order to release the annular flange 28 of the plug-in element 3.

The permanent bending of the locking tabs 57 inward brings about an extremely reliable permanent securing of the plug-in element 3 in the socket element 2. In the event that the partial pulling back of the locking element 4 into the installation position still does not bring about a sufficient release, it is, however, also possible, by pressing the locking elements further inward, to completely remove the locking element 4 out of the socket element 2 together with the plug-in element 3 and thus to release the connection. In order to restore the plug-in connection, use can optionally be made of a new locking element 4.

It is of advantage in the invention that an extremely reliable, permanent and fatigue-free plug-in connection is brought about with comparatively few parts and a simple plugging-in movement.

Of course, it suffices if in each case only one securing element and securing mating element and one locking device and one mating locking device are provided.

The invention claimed is:

1. A coupling system for tubular elements, comprising: a socket element and a plug-in element, wherein a locking element is also provided, wherein the socket element has a tube-like receiving region for receiving the plug-in element, wherein the locking element has a securing element which is supported in a plugging-in direction against a securing mating element of the plug-in element and the locking element is supported with a locking device against a locking mating device on the socket element, and therefore the socket element and the plug-in element are secured axially indirectly via the locking element and thus via the securing element, the securing mating element and the locking device and the locking mating device;

wherein the securing element is configured as a front edge of a locking tongue, wherein the locking tongue is formed on a circumference of the locking element and extends with a free end in the plugging-in direction, and wherein the locking element is positioned axially inward of an axial end of socket element;

wherein at least one securing element and at least one locking device are arranged in the locking element, wherein the securing elements and the locking devices are in each case arranged lying diametrically opposite.

2. The coupling system as claimed in claim 1, wherein the locking element is a tubular or substantially cylindrical component which, in the mounted state, is arranged concentrically around the plug-element and thus radially between the plug-in element and the socket element.

3. The coupling system as claimed in claim 1, wherein the locking device and the securing element are arranged offset from each other with respect to the circumference of the locking element.

4. The coupling system as claimed in claim 1, wherein a seal and a further securing element for the seal are also provided, wherein, in the mounted state, the seal, the further securing element and the locking element axially following one another are in each case arranged coaxially around the plug-in element and between the plug-in element and the socket element.

5. The coupling system as claimed in claim 1, wherein the securing mating element on the plug-in element is designed as a projection or rear edge of an annular flange.

6. The coupling system as claimed in claim 1, wherein the locking mating device is a rear edge of an opening in the lateral wall of the socket element.

7. The coupling system as claimed in claim 1, wherein the locking tongue is extended at its free end by a radially outwardly protruding flange portion, wherein the flange portion has a rectilinear edge at the rear axially in the plugging-in direction and has an axial front side with a chamfer, wherein the chamfer extends axially forwards.

8. The coupling system as claimed in claim 7, wherein the inner circumference of the socket element has at least one ramp by which the diameter of the inner circumference of the socket element is constricted at least in partial regions, wherein the ramp and the chamfer of the locking tongue are designed so as to interact, wherein the ramp serves as a control or sliding surface for the chamfer.

9. The coupling system as claimed in claim 1, wherein latching elements are formed on the circumference of the locking element, wherein the latching elements in top view are of approximately rectangular or square box-like design, wherein the latching elements have a box top, a front box wall and two lateral box walls, wherein the rear box wall is the locking device, wherein the latching element is arranged with at least one spring arm on the locking element in a radially resilient manner, wherein the box top of the latching element has a latching step approximately in the axial longitudinal center.

10. The coupling system as claimed in claim 9, wherein openings through a cylinder lateral wall of the locking element are arranged on the socket element for interaction with the latching elements, wherein the openings have a contour which corresponds to the outer contour of the latching elements, wherein an edge is provided towards the mouth, the edge constituting the locking mating device.

11. The coupling system as claimed in claim 1, wherein the locking element has an annular segment, at least at the front, in the plugging-in direction, wherein the annular segment extends radially inwards, wherein the annular segment has an axial front edge in the plugging-in direction, a rear edge and an encircling outer edge and also an inner encircling edge.

12. The coupling system as claimed in claim 11, wherein a front edge of the annular flange of the plug-in element is designed so as to interact with the edge of the annular segment at the rear in the plugging-in direction in such a manner that, during the plugging-in movement, the front edge of the annular flange of the plug-in element lies against the axially rear edge of the annular segment element of the locking elements and, as the plugging-in element is pushed further forwards, pushes into the socket element, and therefore the front edge of the annular flange of the plug-in element is a carry-along device and that edge of the annular segment element of the locking element which is at the rear in the plugging-direction is a carry-along mating device.

13. A coupling system for tubular elements, comprising: a socket element, a plug-in element, and a locking element, wherein the socket element has a tube-like receiving region for receiving the plug-in element, wherein the locking element has a securing element which is supported in a plugging-in direction against a securing mating element of the plug-in element and the locking element is supported with a locking device against a locking mating device on the socket element, such that the socket element and the plug-in element are secured axially indirectly via the locking element and thus via the securing element, the securing mating element and the locking device and the locking mating device;

wherein the securing element is configured as a front edge of a locking tongue, wherein the locking tongue extends with a free end in the plugging-in direction, wherein the securing mating element comprises part of an annular flange on the plug-in element, and wherein the free end includes a portion that is located radially outward of and over a radially outer edge of the annular flange.

14. A coupling system for tubular elements, comprising: a socket element, a plug-in element, and a locking element, wherein the socket element has a tube-like receiving region for receiving the plug-in element, wherein the locking element has a securing element which is supported in a plugging-in direction against a securing mating element of the plug-in element and the locking element is supported with a locking device against a locking mating device on the socket element, such that the socket element and the plug-in element are secured axially indirectly via the locking element and thus via the securing element, the securing mating element and the locking device and the locking mating device;

wherein the securing element is configured as a front edge of a locking tongue, wherein the locking tongue extends with a free end in the plugging-in direction, wherein the free end includes a radially outwardly protruding flange portion with an axial front side with a chamfer, wherein the chamfer extends axially to a tip of the free end.

15. The coupling system as claimed in claim 14, wherein the securing mating element comprises part of an annular flange on the plug-in element, the annular flange including a rear edge, relative to the plugging-in direction, wherein an inner circumference of the socket element has at least one ramp by which a diameter of the inner circumference of the socket element is constricted at least in partial regions, wherein the ramp and the chamfer of the locking tongue interact such that, during a plugging in operation, the chamfer slides on the ramp and the front edge of the locking tongue is displaced radially inwards axially behind the rear edge to secure the plug-in element on the locking element, wherein the front edge is axially aligned with and located radially inward of the chamfer.

* * * * *